US009148551B2

(12) United States Patent
Hussey et al.

(10) Patent No.: US 9,148,551 B2
(45) Date of Patent: *Sep. 29, 2015

(54) METHOD AND APPARATUS FOR COMPENSATING FOR FIXED PATTERN NOISE IN AN IMAGING SYSTEM

(71) Applicant: Hand Held Products, Inc., Fort Mill, SC (US)

(72) Inventors: Robert M. Hussey, Waxhaw, NC (US); William H. Havens, Syracuse, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,379

(22) Filed: Nov. 18, 2013

(65) Prior Publication Data

US 2014/0063289 A1    Mar. 6, 2014

Related U.S. Application Data

(63) Continuation of application No. 12/781,595, filed on May 17, 2010, now Pat. No. 8,587,697, which is a continuation of application No. 11/998,870, filed on Nov. 30, 2007, now Pat. No. 7,719,580, which is a continuation of application No. 08/828,340, filed on Mar. 28, 1997, now Pat. No. 7,304,670.

(51) Int. Cl.
H04N 5/217 (2011.01)
H04N 5/365 (2011.01)
H04N 5/76 (2006.01)

(52) U.S. Cl.
CPC ........... *H04N 5/2173* (2013.01); *H04N 5/2176* (2013.01); *H04N 5/3651* (2013.01); *H04N 5/3658* (2013.01); *H04N 5/76* (2013.01)

(58) Field of Classification Search
CPC ................................................. H04N 5/2173
USPC .......................... 348/241, 239, 207.99, 222.1; 236/462.11, 462.24, 462.45
See application file for complete search history.

(56) References Cited

U.S. PATENT DOCUMENTS 3,684,868 A    8/1972    Christie et al.
4,602,291 A    7/1986    Temes
(Continued)

FOREIGN PATENT DOCUMENTS

EP    978990 A2    2/2000
EP    1050793 A2    11/2000
(Continued)

OTHER PUBLICATIONS

Intermec Corporation, J7010 Hand-Held Imager User's Manual, 1995, 60 pages. Previously Submitted in Parent Applications.
(Continued)

Primary Examiner — Tuan Ho
(74) Attorney, Agent, or Firm — Additon, Higgins & Pendleton, P.A.

(57) ABSTRACT

The invention relates to a method and apparatus for configuring an imaging system to compensate for fixed pattern noise, variations in pixel values captured from an image sensor that vary according to a fixed pattern. In a method for configuring an imaging system for compensating an additive term component of fixed pattern noise, a pixel array is exposed to a scene of known radiance and an average white value is determined for each pixel of an array. Each average white value is compared to a predetermined reference value to determine a correction value for each pixel. In a method for configuring an imaging system for compensating both an additive and multiplicative component of fixed pattern noise, a pixel array is exposed to a first scene having a first known radiance, and frames of the scene are captured, and then the array is exposed to a second scene having a second known radiance and frames of the second scene are captured.

12 Claims, 7 Drawing Sheets

(56) References Cited

U.S. PATENT DOCUMENTS

| | | |
|---|---|---|
| 4,806,776 A | 2/1989 | Kley |
| 4,806,780 A | 2/1989 | Yamamoto et al. |
| 4,873,426 A | 10/1989 | Sarma et al. |
| 4,874,936 A | 10/1989 | Chandler et al. |
| 4,896,029 A | 1/1990 | Chandler et al. |
| 4,920,428 A | 4/1990 | Lin et al. |
| 4,942,474 A | 7/1990 | Akimoto et al. |
| 4,998,010 A | 3/1991 | Chandler et al. |
| 5,038,391 A | 8/1991 | Yamaguchi |
| 5,047,861 A | 9/1991 | Houchin et al. |
| 5,091,975 A | 2/1992 | Berger et al. |
| 5,120,940 A | 6/1992 | Willsie |
| 5,153,418 A | 10/1992 | Batterman et al. |
| 5,189,292 A | 2/1993 | Batterman et al. |
| 5,212,777 A | 5/1993 | Gove et al. |
| 5,223,701 A | 6/1993 | Batterman et al. |
| 5,243,655 A | 9/1993 | Wang |
| 5,260,554 A | 11/1993 | Grodevant |
| 5,262,623 A | 11/1993 | Batterman et al. |
| 5,286,960 A | 2/1994 | Longacre, Jr. et al. |
| 5,294,783 A | 3/1994 | Hammond, Jr. et al. |
| 5,296,690 A | 3/1994 | Chandler et al. |
| 5,303,064 A | 4/1994 | Johnson et al. |
| 5,304,787 A | 4/1994 | Wang |
| 5,305,122 A | 4/1994 | Hayashi et al. |
| 5,311,001 A | 5/1994 | Joseph et al. |
| 5,343,028 A | 8/1994 | Figarella et al. |
| 5,345,266 A | 9/1994 | Denyer |
| 5,378,881 A | 1/1995 | Adachi |
| 5,378,883 A | 1/1995 | Batterman et al. |
| 5,392,447 A | 2/1995 | Schlack et al. |
| 5,396,054 A | 3/1995 | Krichever et al. |
| 5,410,141 A | 4/1995 | Koenck et al. |
| 5,412,197 A | 5/1995 | Smith |
| 5,414,251 A | 5/1995 | Durbin |
| 5,414,521 A | 5/1995 | Ansley |
| 5,418,862 A | 5/1995 | Zheng et al. |
| 5,420,409 A | 5/1995 | Longacre, Jr. et al. |
| 5,420,943 A | 5/1995 | Mak |
| 5,422,470 A | 6/1995 | Kubo |
| 5,428,211 A | 6/1995 | Zheng et al. |
| 5,428,212 A | 6/1995 | Tani et al. |
| 5,430,286 A | 7/1995 | Hammond, Jr. et al. |
| 5,471,515 A | 11/1995 | Fossum et al. |
| 5,477,042 A | 12/1995 | Wang |
| 5,478,999 A | 12/1995 | Figarella et al. |
| 5,487,115 A | 1/1996 | Surka |
| 5,489,769 A | 2/1996 | Kubo |
| 5,504,524 A | 4/1996 | Lu et al. |
| 5,513,264 A | 4/1996 | Wang et al. |
| 5,519,441 A | 5/1996 | Gusmano et al. |
| 5,524,068 A | 6/1996 | Kacandes et al. |
| 5,534,684 A | 7/1996 | Danielson |
| 5,537,431 A | 7/1996 | Chen et al. |
| 5,545,886 A | 8/1996 | Metlitsky et al. |
| 5,550,366 A | 8/1996 | Roustaei |
| 5,565,669 A | 10/1996 | Liu |
| 5,572,006 A | 11/1996 | Wang et al. |
| 5,591,955 A | 1/1997 | Laser |
| 5,591,956 A | 1/1997 | Longacre, Jr. et al. |
| 5,612,524 A | 3/1997 | Sant' Anselmo et al. |
| 5,637,849 A | 6/1997 | Wang et al. |
| 5,638,465 A | 6/1997 | Sano et al. |
| 5,642,442 A | 6/1997 | Morton et al. |
| 5,646,390 A | 7/1997 | Wang et al. |
| 5,663,549 A | 9/1997 | Katz et al. |
| 5,666,167 A | 9/1997 | Tults |
| 5,698,833 A | 12/1997 | Skinger |
| 5,702,059 A | 12/1997 | Chu et al. |
| 5,703,349 A | 12/1997 | Meyerson et al. |
| 5,710,417 A | 1/1998 | Joseph et al. |
| 5,714,745 A | 2/1998 | Ju et al. |
| 5,723,853 A | 3/1998 | Longacre, Jr. et al. |
| 5,723,868 A | 3/1998 | Hammond, Jr. et al. |
| 5,726,435 A | 3/1998 | Hara et al. |
| 5,739,518 A | 4/1998 | Wang |
| 5,756,981 A | 5/1998 | Roustaei et al. |
| 5,774,357 A | 6/1998 | Hoffberg et al. |
| 5,780,834 A | 7/1998 | Havens et al. |
| 5,784,102 A | 7/1998 | Hussey et al. |
| 5,798,847 A | 8/1998 | Aerts et al. |
| 5,801,962 A | 9/1998 | Sheu et al. |
| 5,814,801 A | 9/1998 | Wang et al. |
| 5,818,028 A | 10/1998 | Meyerson et al. |
| 5,821,518 A | 10/1998 | Sussmeier et al. |
| 5,821,523 A | 10/1998 | Bunte et al. |
| 5,825,006 A | 10/1998 | Longacre, Jr. et al. |
| 5,834,754 A | 11/1998 | Feng et al. |
| 5,857,029 A | 1/1999 | Patel |
| 5,867,594 A | 2/1999 | Cymbalski |
| 5,867,595 A | 2/1999 | Cymbalski |
| 5,875,108 A | 2/1999 | Hoffberg et al. |
| 5,877,487 A | 3/1999 | Tani et al. |
| 5,917,945 A | 6/1999 | Cymbalski |
| 5,920,061 A | 7/1999 | Feng |
| 5,920,477 A | 7/1999 | Hoffberg et al. |
| 5,926,214 A | 7/1999 | Denyer et al. |
| 5,932,862 A | 8/1999 | Hussey et al. |
| 5,949,054 A | 9/1999 | Karpen et al. |
| 5,949,056 A | 9/1999 | White |
| 5,979,763 A | 11/1999 | Wang et al. |
| 5,992,753 A | 11/1999 | Xu |
| 6,003,008 A | 12/1999 | Postrel et al. |
| 6,017,496 A | 1/2000 | Nova et al. |
| 6,019,286 A | 2/2000 | Li et al. |
| 6,034,379 A | 3/2000 | Bunte et al. |
| 6,053,407 A | 4/2000 | Wang et al. |
| 6,062,475 A | 5/2000 | Feng |
| 6,064,763 A | 5/2000 | Maltsev |
| 6,070,800 A | 6/2000 | Fujita et al. |
| 6,075,240 A | 6/2000 | Watanabe et al. |
| 6,082,619 A | 7/2000 | Ma et al. |
| 6,094,509 A | 7/2000 | Zheng et al. |
| 6,119,179 A | 9/2000 | Whitridge et al. |
| 6,123,261 A | 9/2000 | Roustaei |
| 6,123,621 A | 9/2000 | Wolf et al. |
| 6,129,278 A | 10/2000 | Wang et al. |
| 6,157,027 A | 12/2000 | Watanabe et al. |
| 6,170,749 B1 | 1/2001 | Goren et al. |
| 6,176,428 B1 | 1/2001 | Joseph et al. |
| 6,215,992 B1 | 4/2001 | Howell et al. |
| 6,232,973 B1 | 5/2001 | Dow et al. |
| 6,264,015 B1 | 7/2001 | De Kock et al. |
| 6,298,176 B2 | 10/2001 | Longacre, Jr. et al. |
| 6,304,313 B1 | 10/2001 | Honma et al. |
| 6,329,139 B1 | 12/2001 | Nova et al. |
| 6,347,163 B2 | 2/2002 | Roustaei |
| 6,375,075 B1 | 4/2002 | Ackley et al. |
| 6,486,911 B1 | 11/2002 | Denyer et al. |
| 6,491,223 B1 | 12/2002 | Longacre, Jr. et al. |
| 6,493,029 B1 | 12/2002 | Denyer et al. |
| 6,508,404 B2 | 1/2003 | Hecht |
| 6,547,139 B1 | 4/2003 | Havens et al. |
| 6,547,142 B1 | 4/2003 | Goren et al. |
| 6,561,428 B2 | 5/2003 | Meier et al. |
| 6,565,003 B1 | 5/2003 | Ma |
| 6,585,159 B1 | 7/2003 | Meier et al. |
| 6,606,171 B1 | 8/2003 | Renk et al. |
| 6,621,598 B1 | 9/2003 | Oda |
| 6,655,595 B1 | 12/2003 | Longacre, Jr. et al. |
| 6,655,597 B1 | 12/2003 | Swartz et al. |
| 6,678,412 B1 | 1/2004 | Shigekusa et al. |
| 6,688,523 B1 | 2/2004 | Koenck |
| 6,722,569 B2 | 4/2004 | Ehrhart et al. |
| 6,732,929 B2 | 5/2004 | Good et al. |
| 6,736,321 B2 | 5/2004 | Tsikos et al. |
| 6,739,511 B2 | 5/2004 | Tsikos et al. |
| 6,742,707 B1 | 6/2004 | Tsikos et al. |
| 6,820,811 B1 | 11/2004 | Detwiler |
| 6,834,807 B2 | 12/2004 | Ehrhart et al. |
| 6,854,649 B2 | 2/2005 | Worner et al. |
| 6,857,570 B2 | 2/2005 | Tsikos et al. |
| 6,863,216 B2 | 3/2005 | Tsikos et al. |
| 6,889,904 B2 | 5/2005 | Bianculli et al. |

(56) References Cited

U.S. PATENT DOCUMENTS

| | | | |
|---|---|---|---|
| 7,249,714 | B2 | 7/2007 | Gong et al. |
| 7,304,670 | B1 | 12/2007 | Hussey et al. |
| 7,441,905 | B2 | 10/2008 | Tseng et al. |
| 7,497,383 | B2 | 3/2009 | Barkan |
| 7,719,580 | B2 | 5/2010 | Havens et al. |
| 7,780,089 | B2 * | 8/2010 | Wang ............... 235/462.45 |
| 8,587,697 | B2 | 11/2013 | Hussey et al. |
| 8,917,336 | B2 * | 12/2014 | Cote et al. ............... 348/241 |
| 2001/0009428 | A1 | 7/2001 | Dow et al. |
| 2001/0046036 | A1 | 11/2001 | Honma |
| 2002/0000470 | A1 | 1/2002 | Lanzaro et al. |
| 2004/0155110 | A1 | 8/2004 | Ehrhart et al. |
| 2005/0167504 | A1 | 8/2005 | Meier et al. |
| 2009/0020612 | A1 | 1/2009 | Drzymala et al. |
| 2011/0241876 | A1 | 10/2011 | Kearney |

FOREIGN PATENT DOCUMENTS

| | | | |
|---|---|---|---|
| GB | 2357209 | A | 6/2001 |
| JP | 11232378 | A | 8/1999 |
| JP | 2000050028 | A | 2/2000 |
| WO | 9016033 | A1 | 12/1990 |
| WO | 9110207 | A1 | 7/1991 |
| WO | 9410652 | A1 | 5/1994 |
| WO | 9534043 | A1 | 12/1995 |
| WO | 9639676 | A1 | 12/1996 |
| WO | 9708647 | A1 | 3/1997 |
| WO | 03001435 | A1 | 1/2003 |
| WO | 03081520 | A1 | 10/2003 |
| WO | 03081521 | A1 | 10/2003 |
| WO | 2004064382 | A1 | 7/2004 |

OTHER PUBLICATIONS

Marshall Electronics, Optical Systems Division, Monochrome Monolithic Image Sensor With Analogue and Digital Outputs VVL1070 Specification, Believed to be published in 1994, pp. 1-24. Previously Submitted in Parent Applications.

Sony Corporation, ICX084AL, Technical Specification, Believed to be published prior to Jan. 22, 2000. Previously Submitted in Parent Applications.

Text String Extraction from Images of Colour-Printed Documents—IEEE Proc.—Vis. Image Signal Process., vol. 143, Suen H. M., et al., No. 4, Aug. 1996, pp. 210-216. Previously Submitted in Parent Applications.

VLSI Vision Ltd., High Resolution EIA/CCIR Monochrome Monolithic Camera Specification, VVL-1060, Apr. 1994, pp. 1-23. Previously Submitted in Parent Applications.

VLSI Vision Ltd., Serial Interface Specification, VCL-1060, Apr. 1994, pp. 1-9. Previously Submitted in Parent Applications.

VVL 1070 Engineering Evaluation Kit Specification, Sep. 27, 1994, V1.1, pp. 1-5. Previously Submitted in Parent Applications.

Warren J. Smith, Modern Optical Engineering, detailed discussion of the cosine effect, McGraw-Hill 1999, Previous Edition cited in Specification. 8 pages total.

* cited by examiner

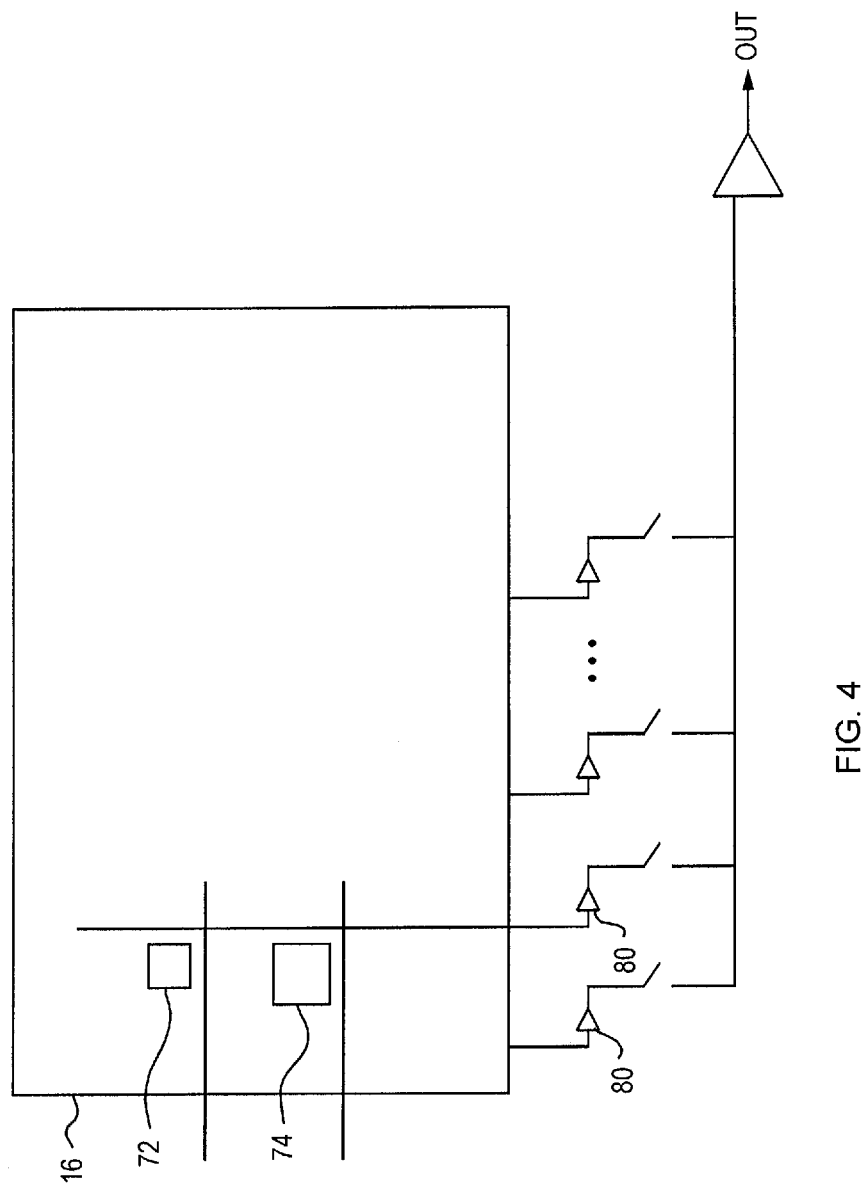

METHOD AND APPARATUS FOR COMPENSATING FOR FIXED PATTERN NOISE IN AN IMAGING SYSTEM

CROSS REFERENCE TO RELATED APPLICATIONS

The present application is a continuation of U.S. patent application Ser. No. 12/781,595 for a Method and Apparatus for Compensating for Fixed Pattern Noise in an Imaging System filed May 17, 2010 (and published Nov. 18, 2010 as U.S. Patent Application Publication No. 2010/0289919), now U.S. Pat. No. 8,587,697, which is a continuation application of U.S. patent application Ser. No. 11/998,870 for a Method and Apparatus for Compensating for Fixed Pattern Noise in an Imaging System filed Nov. 30, 2007 (and published Jun. 19, 2008 as U.S. Patent Application Publication No. 2008/0143855), now U.S. Pat. No. 7,719,580, which is a continuation of U.S. patent application Ser. No. 08/828,340 for a Method and Apparatus For Adjusting Pixel Values In An Imaging System filed Mar. 28, 1997, now U.S. Pat. No. 7,304,670. Each of the foregoing patent applications, patent publications, and patents is hereby incorporated by reference in its entirety.

BACKGROUND OF THE INVENTION

1. Field of the Invention

The invention relates generally to image signal processing and in particular to a method and apparatus for compensating for fixed pattern noise in image sensor image signals.

2. Background of the Prior Art

When pixel values, representative of pixel voltages are read from an image sensor pixel array, slight inconsistencies are observable between the voltages of the various pixels even when the array is exposed to a scene of uniform radiance. The inconsistency in the pixel values read from the various pixels is commonly referred to as "noise" either of a fixed pattern noise type or a random noise type.

Fixed pattern noise refers to inconsistencies in the responsiveness of an image sensor output that results from sensor characteristics or properties affecting pixels of the sensor in the same way each time data is captured from those pixels. Random or stochastic noise refers to inconsistencies which vary each time data is captured from the pixels.

While random or stochastic noise cannot be compensated, it is useful to adapt an imaging system in video signal generating or decoding applications to automatically compensate pixel values that deviate from patterns that might be expected based on the array's radiance pattern.

Various problems have been noted in prior art imaging systems configured for fixed pattern noise compensation, both in set up routine methods for configuring an imaging system for fixed pattern noise compensation, and in methods for compensating pixel values read from a pixel array.

In one known setup routine for configuring an imaging system to compensate for fixed pattern noise, a pixel array is exposed to uniform "dark frame" by shielding the pixel array from light. The pixel values read from the array during exposure to the dark frame are then used to determine pixel offset terms. This method can be employed to estimate an additive component of fixed pattern noise, but cannot be used to determine a multiplicative component of fixed pattern noise. Furthermore, the setup method involving exposure to a dark frame is susceptible to measurement clipping. If a change in incident radiance does not result in a change in pixel value, then clipping has occurred.

In a known analog hardware method for compensating voltages read from a pixel array, hardware components are provided and selectively activated to compensate pixel voltages shifted out of a pixel array. A major problem with this scheme is that values read from the array can be corrected only to a small number of discrete voltages, thereby limiting the precision of the correction. Also, this scheme requires additional hardware.

Failure to compensate adequately for fixed pattern noise has significant consequences, for example, when an imaging system is employed in indicia decoding applications. In such applications, it is common to define an area of interest in a captured image before decoding algorithms commence. Fixed pattern noise has been observed to cause a symbology decoding apparatus to misplace edge positions, and to result in erroneous identification of edge positions. The likelihood of an erroneous edge position identification increases when a decoding apparatus is employed to capture symbols having higher densities.

SUMMARY OF THE INVENTION

According to its major aspects and broadly stated the present invention relates to a method and apparatus for configuring an imaging system to compensate image signals for the effects of fixed pattern noise, noise which affects image sensor element outputs in the same way each time data is captured from those elements. An imaging system according to the invention can include a setup mode of operation for determining parameters for use in compensating fixed pattern noise, and a run mode of operation wherein the parameters determined in a setup mode are used to compensate pixel values or values captured from the pixel elements.

Fixed pattern noise can result from a variety of sources. For example fixed pattern noise can result from inconsistencies in the physical properties of electrical components of the image sensor such as switching components associated with each pixel, or in certain types of image sensors with column amplifiers associated with each column. Fixed pattern noise can also result from certain illumination apparatus configurations. If the illumination is characteristically non-uniform, but its characteristics are fixed each time data is captured, then fixed pattern noise results. Another common source of fixed pattern noise is an optical phenomena known as the cosine[4] (cosine) effect which results in outer pixels of an array receiving lower intensity light rays than center pixels on exposure to a scene of uniform radiance.

Fixed pattern noise associated with a pixel can be expressed mathematically by $$P_M = M P_{REF} + A \qquad \text{Eq. 1}$$

where $P_M$ is the observed, or measured pixel value, $P_{REF}$ is a reference value normally selected to correspond to an actual irradiance of light received at a pixel, M is a multiplicative or gain term, and A is an additive, or offset term influencing fixed pattern noise. Typically, M is a value near unit and A is a small fraction of $P_M$, the measured pixel value. For some sources of fixed pattern noise, such as the cosine effect, the multiplicative term is dominant while for other sources of fixed pattern noise, such as amplifier offset fixed pattern noise, the additive term is dominant. Other sources of fixed pattern noise have both significant multiplicative and significant additive terms contributing to fixed pattern noise.

In certain setup routines that can be implemented, according to the invention, which are best used in the case where the additive term of fixed pattern noise is expected to be dominant, the multiplicative term of fixed pattern noise may be considered to be unitary. When the multiplicative term is assumed to be unitary, Eq. 1 reduces to $$P_M = P_{REF} + A \qquad \text{Eq. 2.}$$

In a setup routine that can be implemented for determining only an additive term of fixed pattern noise, an image sensor is exposed to a scene of uniform radiance, and a predetermined number of frames of the scene are captured in the system's memory. The gray scale value, or white value associated with each pixel of the pixel array image sensor is then calculated and also stored into memory. As the number of predetermined frames increases the contribution of zero mean random noise to the average white value diminishes since, by definition, zero mean random noise is as likely to result in an increase in a pixel value as it is to result in a decrease in pixel value. That is, positive and negative random noise terms tend to cancel each other as the number of frames increases.

The scene of uniform radiance to which a pixel array is exposed is preferably a gray scale uniform radiance scene, that is, a scene which does not result either in a maximum clipped or minimum clipped pixel value being read from the pixels in the pixel array. By providing a uniform radiance scene yielding gray scale pixel values between these two limits, the problem of measurement clipping is avoided.

Once an average white value is determined for each pixel, a reference value is subtracted from an average white value to determine a correction value for each pixel. The reference value, substituted for $P_{REF}$ in Eq. 2 may be a predetermined gray scale value or may be determined based on the value of all or some of the remaining average white values. The reference value normally corresponds to the actual light irradiance of light falling on the pixel. While this value cannot be measured directly, it can be assumed for the purposes of determining a correction value, in one simplified embodiment, that each pixel in an array that is exposed to a scene of uniform radiance has equal irradiance of light falling thereon, or that pixels in a predefined region of an array have the same levels of irradiance received thereon. This is used to calculate the correction values. Once determined, the correction value associated with each pixel is stored into memory. When the imaging system is switched from a setup mode to a run mode of operation, the correction values are retrieved from memory and used to correct pixel values of captured frames. Because the correction values are determined before the imaging system is switched from a setup mode of operation to a run mode of operation, the correction values are independent of any image represented in the captured frames captured by the imaging system when in a run mode of operation.

In a setup method that can be implemented according to the invention for determining both multiplicative term and additive terms influencing fixed pattern noise a pixel array is exposed to at least two scenes having uniform but differing radiances. It can be seen with reference to Eq. 1 that if the relationship between the differing radiances of the first and second scenes is known, the multiplicative term, along with the additive term of fixed pattern noise can be determined.

In accordance with a method that can be implemented for determining both multiplicative and additive fixed pattern noise terms, a plurality of frames of a pixel array are captured when the array is exposed to a scene of a first radiance, and a plurality of additional frames are captured when an array is exposed to a scene having a second radiance. In order to determine the multiplicative and additive terms for a given pixel, the average white value of the pixel following exposure to the first scene is substituted for $P_M$ in equation 1 in the development of a first equation, and the average white value of the pixel following exposure to the second scene is substituted for $P_M$ in the development of a second equation. $P_{REF}$ for a given pixel in the first and second equations will normally correspond to the expected actual irradiance of the pixel during exposure to the first and second scenes, respectively. Solving for the set of two equations having two unknowns using well known computational methods solves for both the multiplicative and additive components of fixed pattern noise.

Further aspects of the invention relate to methods and apparatuses for compensating pixel values read from a pixel array, once the additive term and/or multiplicative term correction values have been determined. As discussed in the background, prior art compensation schemes include hardware components which are selectively activated so that voltages read from a pixel array are automatically corrected in accordance with previously determined correction terms.

In the present invention, gray scale correction values can be stored in predetermined memory locations of the imaging system. Preferably, so that processing time is minimized, the correction terms are read from memory and used to correct pixel values in the case of decoding applications only when stored pixel values are read from memory during execution of a decoding algorithm. An advantage of the compensation method of the present invention is that the method of the present invention allows correction values to be selected between a large number of discrete values, without requiring the providing of costly and space consuming physical elements as in the prior art design. The correction method of the present invention may be used in combination with a hardware implemented compensation scheme.

The features discussed above and other features of the invention will become clear to persons skilled in the art from a reading of a Detailed Description of the Preferred Embodiments combined with the referenced drawings.

BRIEF DESCRIPTION OF THE DRAWINGS

In the drawings, wherein like numerals are used to indicate the same elements throughout the views.

FIG. 4 shows an electrical diagram of an image sensor illustrating schematic representations of electrical components of the image sensor whose variance in physical properties gives rise to variance in emitted signal output between the several pixels;

DETAILED DESCRIPTION OF THE PREFERRED EMBODIMENTS

Figure 1:
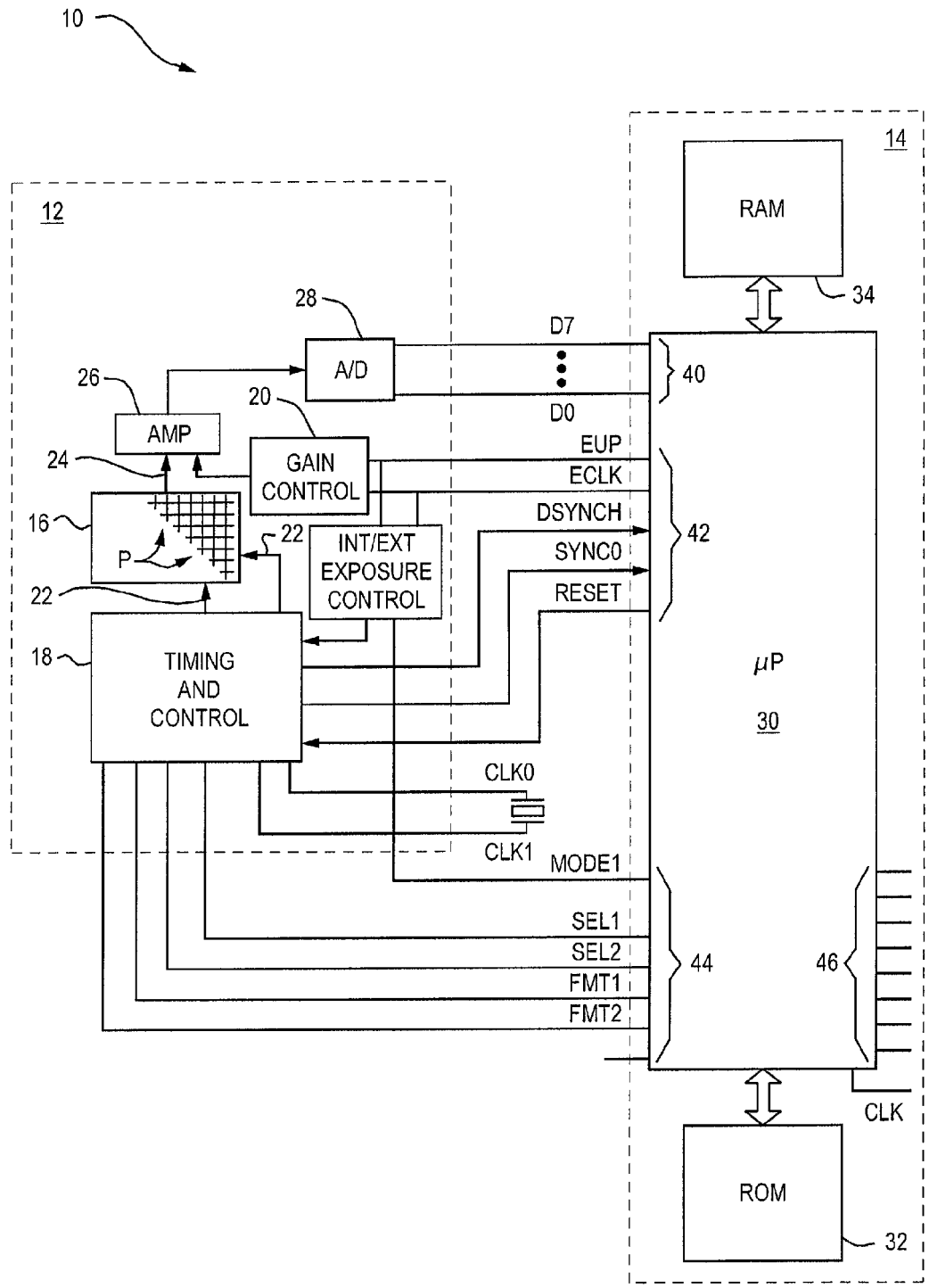
FIG. 1 is a block diagram of an image processing system in which the present invention may be implemented.

An imaging system 10 having an image sensor 12 and control processor 14 in which the present invention may be incorporated is shown in FIG. 1.

Image sensor 10 includes, on a single substrate a two dimensional array 16 of light sensitive picture elements, or pixels upon which an optical system is arranged to focus an image of indicia and further includes a timing and control circuit 18 for electrically addressing pixels P via horizontal and vertical address lines 20 and 22, thereby causing electrical signals representing the image to be read out of array 16 via output 24 thereof. After amplification by amplifier 26, and conversion by analog-to-digital converter 28 the latter signals are output from chip 12 as serial digital parallel image data signals on lines D0=D7 or as a digital serial image data signal on data lines D0-D1.

Digital image data is supplied from sensor 12 to processor 14 with the aid of a first signal known as a frame start pulse and a second signal known as data valid pulse. Because the use of such signals is well known to those skilled in the art, their use will not be described in detail herein.

Image sensor control processor 14 preferably comprises a microprocessor 30 which may be of either the single chip or multi-chip types, and which may include on chip and/or off chip program and data (working) memories 32 and 34, depending upon the complexity of the program used to control image sensor 12 and to process image data produced thereby. Microprocessor 30 may be of the type which is formed on a single integrated circuit chip and which includes an on-chip read only programmable program memory 32 and an on-chip read-write working memory 34. Microprocessor 30 may also be of the type which includes four eight-bit (I/O) ports, 40 through 46, each bit of each port being independently controlled by the stored program. Because microprocessor systems of this type, and their multi-chip equivalents are well known to those skilled in the art, microprocessor 30 will not be described in detail herein.

Figure 2:
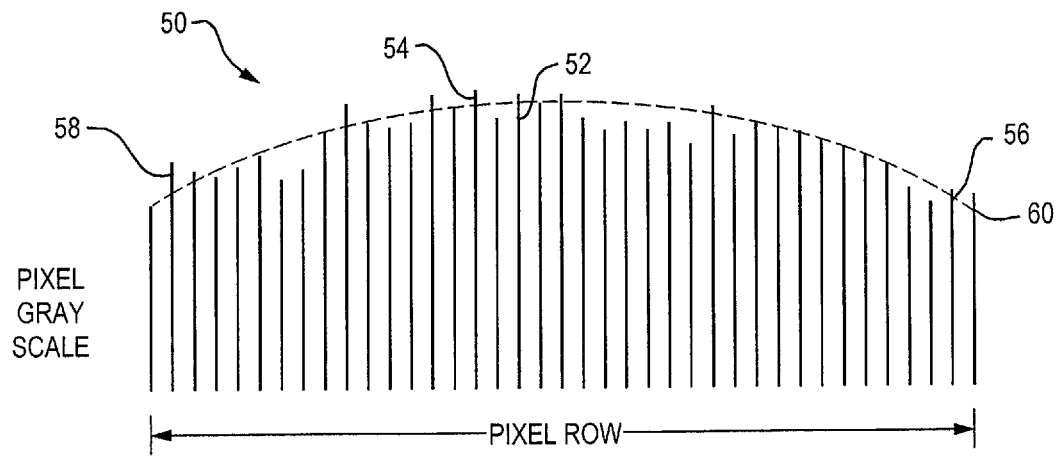
FIG. 2 is a simplified graphical representation of a digital output of an image sensor exposed to a scene of uniform radiance corresponding to a single row of pixels.

With reference now to specific attributes of the present invention, FIG. 2 is a simplified representation of the digital output of image sensor 12 when pixel array 16 is exposed to a scene of uniform radiance. For purposes of simplifying the description of the invention, the digital output of FIG. 2 illustrates only 20 representative column values of the pixel columns in a commercially available pixel array, which are available in many different dimensions including 160 rows by 160 columns (in a VVL 1070 image sensor available from VLSI Vision Limited), and which are expected to become available in increasing densities. The above referenced VVL 1070 image sensor is a monochrome image sensor.

In an ideal image sensor, output 50 might be expected to yield an identical pixel value for each pixel in a row on exposure to a scene of uniform radiance. From row output 50 it is seen that an actual image sensor does not exhibit such behavior. Instead, pixel values vary from pixel to pixel in the row. The variation or inconsistency in the pixel values generated by the pixels in an array on exposure of the sensor to a uniform radiance scene is referred collectively to as "noise."

Fixed pattern noise refers to a variation among pixel values resulting from factors affecting pixel values in the same way and to the same extent each time data is read from the pixels.

One source of fixed pattern noise results from differences in the size and other physical characteristics of miniature integrated circuit components. With reference to the pixel array schematic diagram of FIG. 4 each pixel location 72, 74 has associated therewith switching circuit component (not shown) and a separate column amplifier 80 is associated with each column of array 16. The voltages exhibited by pixels of the array will vary from one another on exposure to a uniform radiance scene as a result in part of slight differences in the physical properties of switching circuit components and amplifiers 80, and other electrical components which may be associated with array 16. Column amplifiers are the dominant source of fixed pattern noise in several types of available image sensors. Differences in the physical characteristics of optical components, namely of pixels 72, 74 of pixel array 16 can also give rise to noise that varies according to a fixed pattern.

Fixed pattern noise can also result from certain illumination apparatus configurations. If the illumination is characteristically non-uniform, but its characteristics are fixed every time an image is captured, then fixed pattern noise results. An illumination apparatus can result in fixed pattern noise if, for example, the illumination apparatus includes a bank of illuminators which are not precisely matched, or if one or more illuminators are swept over a target scene. By correcting the effects of fixed pattern noise, a truer representation of a given scene is produced by an imaging system.

Figure 3:
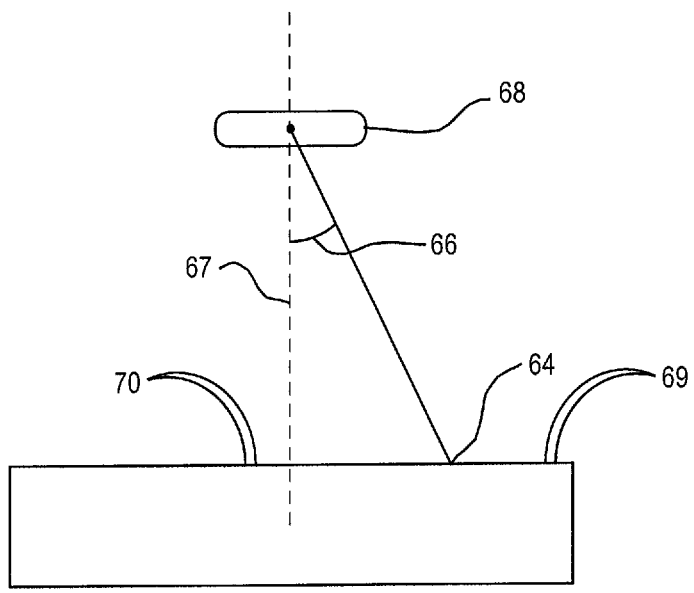
FIG. 3 shows a pixel array and an associated lens attached thereto.

Another source of fixed pattern noise is an optical phenomena known as the cosine$^4$, or cosine effect, which is described with reference to FIG. 3. According to the cosine effect, the irradiance at a given pixel 64 is proportional to the cosine to the fourth power of the angle 66 defined between optical axis 67 and pixel 64 as seen by lens 68. Therefore outer pixels, e.g., 69 tend to have lower irradiances associated therewith than center pixels 70. A detailed discussion of the cosine effect appears in *Modern Optical Engineering*, Smith, Warren J. (McGraw-Hill, 1966), pp. 132-133.

Referring again to the block diagram of FIG. 1 aspects of imaging system enabling system 10 to compensate for fixed pattern noise will be described in detail. According to the invention, imaging system 10 has two modes of operation: A first, set up mode for configuring the system for compensating fixed pattern noise; and a second, run mode for operating the system in one of several possible operating applications such as bar code and other decoding operating applications, and video display operating applications, and video record operating applications. On-board control processor 14 which is integral with imaging system 10 is normally configured to execute the set up mode of operation. However, an external processor (not shown) may in the alternative be configured to carry out the setup routine, and control processor may be of a type that is dedicated for executing a run mode of operation. The setup mode of operation may be executed only once during the lifetime of imaging system 10 at the location of production before imaging system 10 is distributed to an end user.

The setup routines according to the invention, and the run mode operation methods of the invention utilize a mathematical expression for fixed pattern noise which is given by $$P_M = MP_{REF} + A \qquad \text{Eq. 1}$$

where $P_M$ is the observed, or measured pixel value, PREF is a reference value normally selected to correspond to an actual irradiance of light received at a pixel, M is a gain, or multiplicative term, and A is an additive, or offset term influencing fixed pattern noise. For some sources of fixed pattern noise, such as the cosine effect, the multiplicative term is dominant while for other sources of fixed pattern noise the additive noise term is dominant. Other sources of fixed pattern noise have both significant multiplicative and significant additive terms contributing to fixed pattern noise. Note that Eq. 1 represents a first order process. It will be recognized that higher order processes are possible and can be corrected for.

In certain setup routines according to the invention, which are best used in the case where the additive term of fixed pattern noise is expected to be dominant, the multiplicative term of fixed pattern noise may be considered to be unitary. When the multiplicative term is assumed to be unitary, Eq. 1 reduces to $$P_M = P_{REF} + A \qquad \text{Eq. 2}$$

A configuration method for determining only an additive component of fixed pattern noise is described with reference to the flow diagram of FIG. 5a. In this method, pixel array 16 at step 102 is exposed to a scene of uniform radiance, and a predetermined number of frames of the scene are captured and stored in working memory 34. The average gray scale value, or the average white value generated by each pixel of the pixel array image sensor is then calculated at step 104 and also 15 stored into memory. Of course, according to a well known programming technique it is not necessary to store every test frame into memory. In a dedicated memory location the running sum of white values may be stored and the average white value for a given pixel may be computed by dividing the running sum by the number of test frames captured. As the number of predetermined frames increases the contribution of zero mean random noise to average white value diminishes since, by definition, zero mean random noise is as likely to result in an increase in a pixel voltage as it is to result in a decrease in pixel voltage. That is, positive and negative random noise terms tend to cancel each other as the number of frames increases. Therefore as the number of frames increases the average white value for each pixel converges on a value representing the contribution to the pixel signal from effects remaining stable each time data is recorded from the pixel.

The scene of uniform radiance to which a pixel array is exposed is preferably a scene which yields pixel values between maximum clipping and minimum clipping pixel values by providing a scene yielding only gray scale pixel values between these two limits, thus the problem of measurement clipping is avoided. The uniform radiance scene can be applied to a pixel array by, for example, application of a constant source of irradiance to a Lambertian target (which may be supplied by a sheet of white paper) positioned forward of the pixel array, or by application of an appropriate source of illumination directly to the pixel array, such as a light bulb directing light through a sheet of milk glass toward the pixel array, or by a CRT monitor directed at the array. While a scene of uniform radiance is preferred for the purposes of simplifying various mathematical calculations required by the invention as described herein, it will be recognized that the setup routines of the invention can be executed by applying non-uniform scenes to the pixel array as long as radiance characteristics of the applied non-uniform scenes are known and controlled.

Figure 5A:
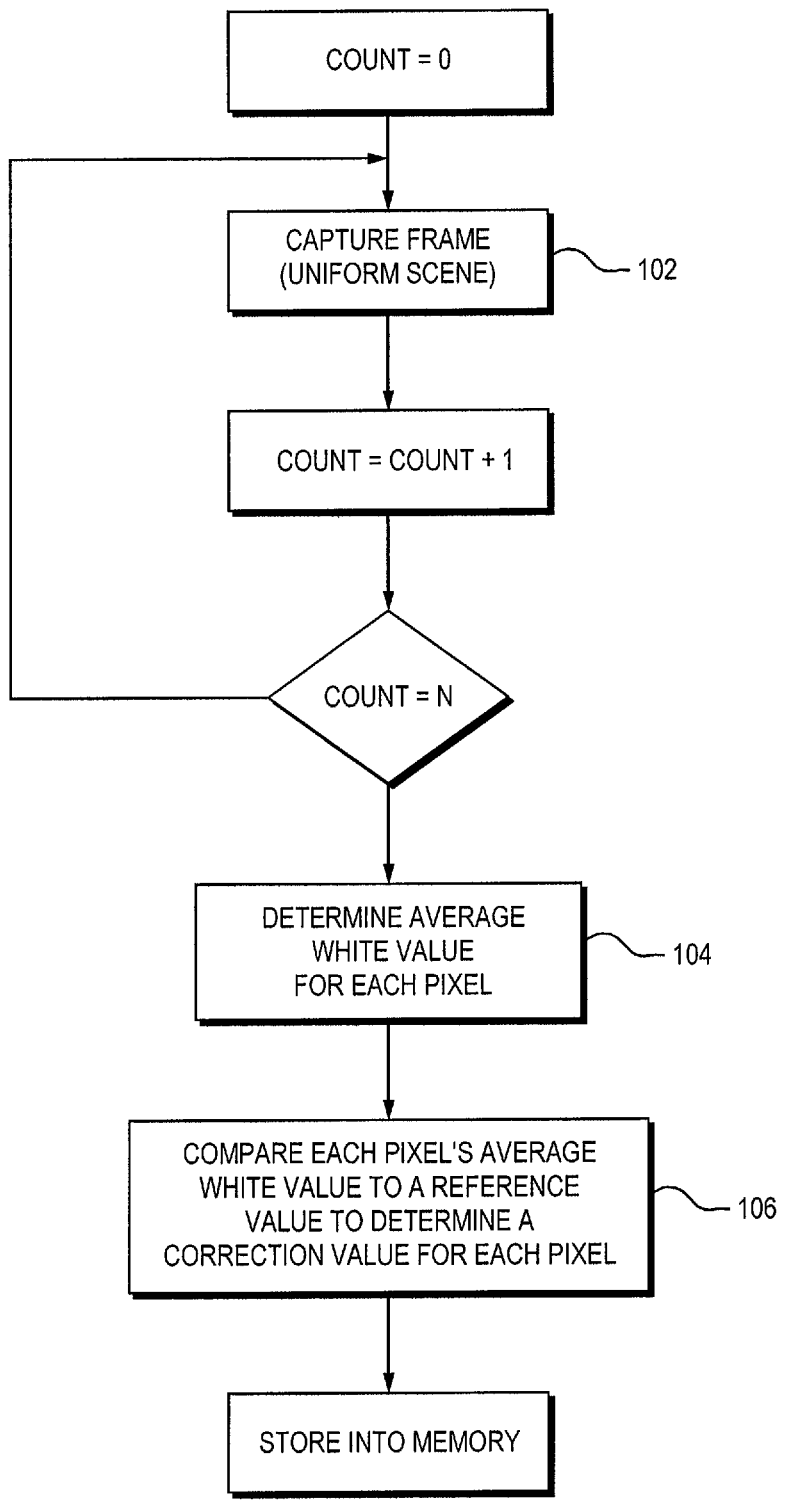
FIG. 5a is a flow diagram of a configuration method for configuring an imaging system to compensate for an additive component of pixel-specific fixed pattern noise.

Referring again to the flow diagram of FIG. 5a it is seen that once an average white value is determined for each pixel, a reference value, substituted for $P_{REF}$ in Eq. 2, is subtracted from the average white value at step 106 to determine a correction value for each pixel. The reference value may be a predetermined gray scale value or may be determined based on the value of all or some of the remaining average white values. For example, a reference value for a given pixel of interest may be determined by averaging average white values of pixels surrounding and possibly including the pixels of interest. Once determined, the correction associated with each pixel is stored, typically by writing the correction values into program memory 32. When the system is switched to a "run" mode of operation, the correction values are retrieved from memory 32 and used to correct pixel values of captured frames captured from a scene. Because the correction values are determined before the imaging system is switched from a setup mode of operation to a run mode of operation, the correction values are independent of any image represented in the captured frames captured by the imaging system when in a run mode of operation.

When system 10 is in a "run" mode of operation, individual pixels may be corrected by the correction values according to one of a number of possible techniques. For example, the correction value associated with each pixel can be read from ROM 32 and added to the pixel signal values before the pixel values are initially stored in RAM 34 or transmitted to further signal processing circuitry. Equivalent correction methods correcting pixel values after digital to analog but before storage memory can be implemented in digital hardware such as FPGA or an ASIC. In accordance with one embodiment of the invention, correction values can be read from ROM 32 and added to pixel values previously stored in RAM 34 only when captured frames of images are retrieved from RAM 34 during execution of decoding applications. It is common in embodiments of the invention to employ a direct memory access device (not shown) controlled by microprocessor 30 to aid in the transfer of frames of pixel array data from image sensor to RAM 34 or to further video monitor circuit components, thereby enhancing the speed and performance capabilities of microprocessor 30.

A compensation method equivalent to the image sensor specific embodiment described herein adapted for implementation in a 2D laser scanning device employed to correct for additive and multiplicative signal variations in the system response over the scanning field of view. In this embodiment the laser would scan the entire field of view and over one or more optical sensors would receive the returned optical signal. The series of signals created in this fashion would be read into memory together with clocking information from the scanning device. This data can be processed in a fashion analogous to the image array data discussed herein.

Figure 5B:
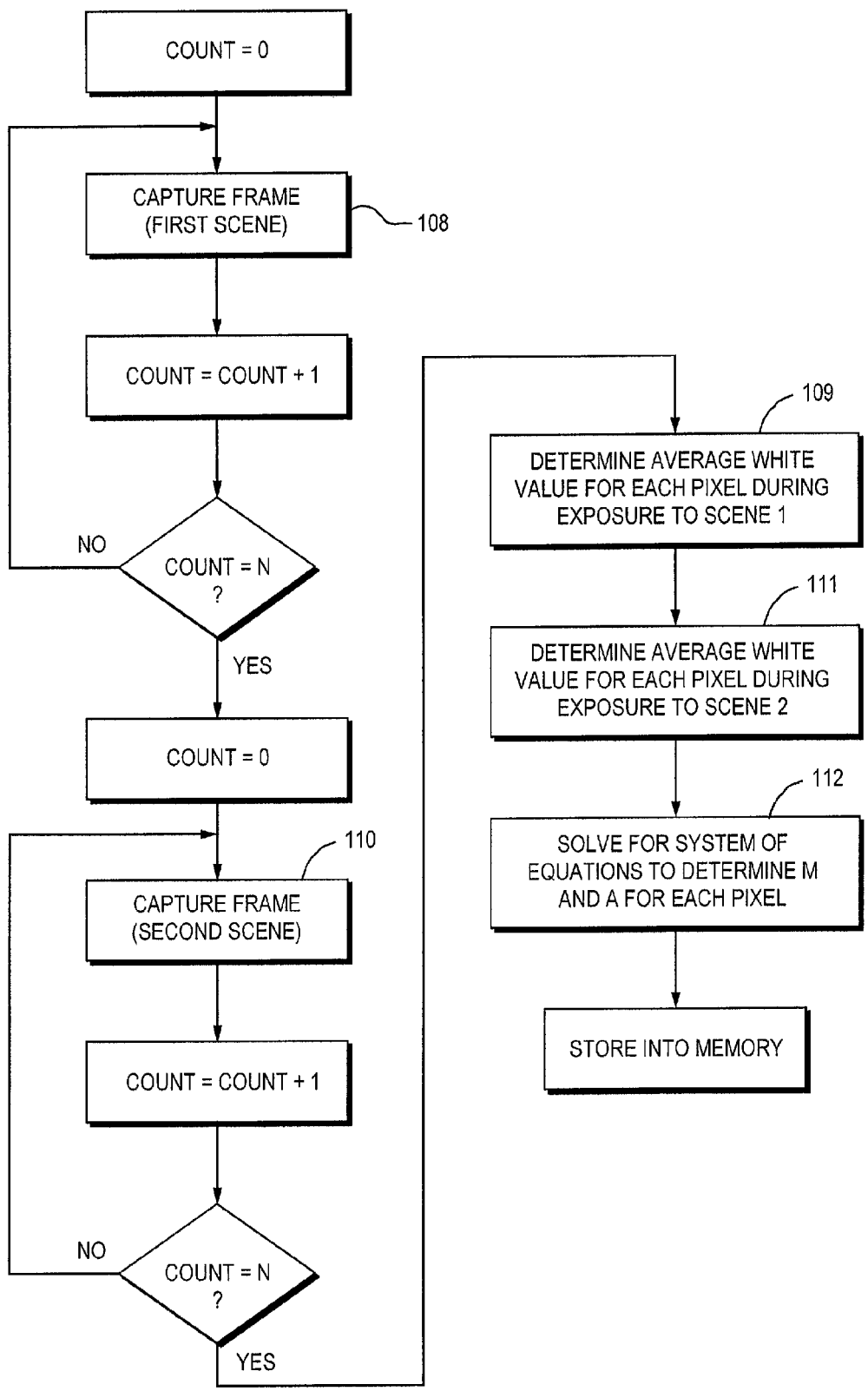
FIG. 5b is a flow diagram of a configuration method for configuring an imaging system to compensate for an additive and multiplicative component of pixel-specific fixed pattern noise.

A setup method for determining both multiplicative and additive terms contributing to fixed pattern noise is described with reference to FIG. 5b. In a setup method according to the invention for determining both multiplicative term and additive terms influencing fixed pattern noise a pixel array is exposed to at least two scenes having uniform but differing radiances. It is seen with reference to Eq. 1 that if a pixel array is exposed to two scenes having differing but known radiances, and the relationship between the two scenes is known then a set of two equations having two unknowns is formed:

$$P_{M1} = MP_{REF1} + A \qquad \text{Eq. 3}$$

$$P_{M2} = MP_{REF2} + A \qquad \text{Eq. 4}$$

where $P_{REF1}$ is a reference value normally selected to correspond to the actual light irradiance received at pixels of an array on application of a scene of a first radiance and $P_{REF2}$ is a reference value corresponding to the actual light irradiance of light received at pixels of an array on application of a scene having a second radiance. $P_{M1}$ is the observed or measured pixel value of a pixel resulting from application of the first scene, and $P_{M2}$ is the measured pixel value of a pixel resulting from application of the second scene.

According to a specific method for determining a multiplicative term influencing fixed pattern noise, a plurality of frames corresponding to a pixel array exposed to a scene having a first known radiance may be captured at step 108 to determine, at step 109 an average white value corresponding to application of the first scene (so as to determine an average pixel value wherein contribution of random noise is reduced to an insignificant level), and then a plurality of frames of a pixel array exposed to a uniform radiance scene having a second radiance may be captured to determine at step 110 an average observed pixel value for each pixel corresponding to application of the second scene. Substituting the first and second average observed pixel values for $P_{M1}$ and $P_{M2}$ in Eqs. 3 and 4 respectively, equations 3 and 4 are solved using well known mathematical methods at step 112 to determine the multiplicative term, M and offset term, A, affecting fixed pattern noise for each pixel in working memory 34.

The determined values for M and A associated with each pixel are stored, preferably in ROM 32 and later used to compensate captured pixel values using Eq. 1 when the unit is switched to a "run" mode of operation.

While the values $P_{REF}$, $P_{REF1}$, and $P_{REF2}$ in equations 1, 3, and 4, corresponding to actual pixel irradiance cannot be measured directly, certain assumptions can be made regarding actual pixel irradiance in the solving for the set of equations 3, 4, and 5 or derivations thereof. For example, if a pixel array is exposed to a scene of uniform radiance it can be assumed, for the purposes of carrying out the calculations that each pixel in the pixel array has the same actual pixel irradiance. Alternatively one might assume that all the pixels in a local region of an array have the same actual value. The latter assumption allows for gradual change in illumination incident upon the pixel array such as the change due to the cosine effect when the scene is imaged through a lens.

Figure 6:
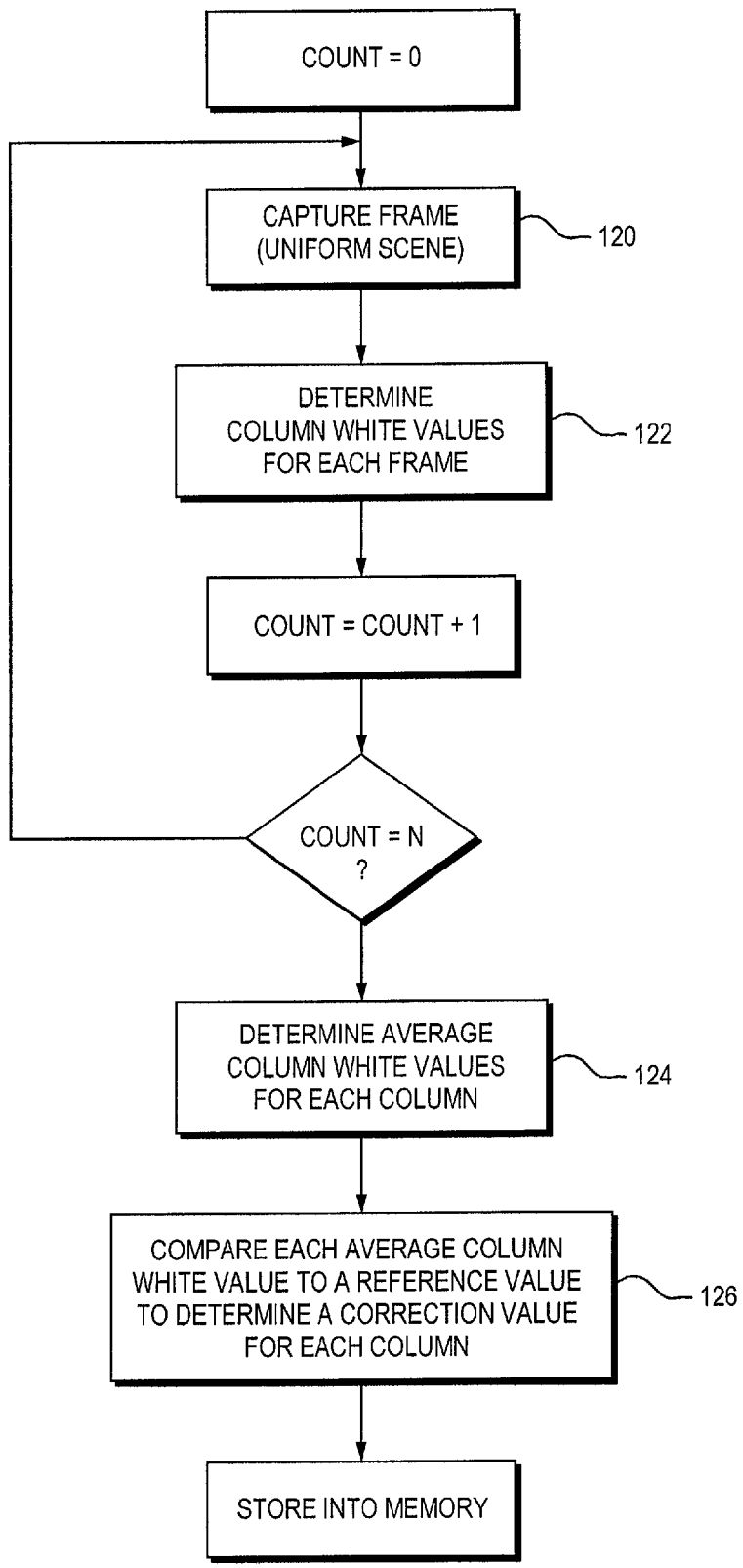
FIG. 6 is a flow diagram of a configuration method for configuring an image system to compensate for column-dominant fixed pattern noise.

A specialized embodiment of the invention implemented to compensate for a specific source of fixed pattern noise is described with reference to FIG. 6. In one embodiment of the invention, imaging system 10 is configured to compensate for column-dominant fixed pattern noise having a dominant effect observable on a column-by-column basis. In a common type of image sensor, fixed pattern noise results in part from slight inconsistencies in the physical properties of amplifiers 80 associated with each pixel column. In such image sensors, every pixel in a given column is affected by the column amplifier associated with the column in the same way. When column amplifiers are the dominant source of fixed pattern noise, a simplified setup routine of the invention can be made to determine column correction values, for use in correcting each pixel of a given column. In this case, correction terms are computed and stored on a column by column basis rather than a pixel by pixel basis, resulting in a significant savings in memory storage space.

In one type of image sensor architecture as shown in FIG. 4 a column amplifier 80 associated with each pixel of a column array typically comprises a pair of integrated circuit field effect transistors. It is recognized that the consistency achievable between each column's amplification is limited by the precision with which each amplifier is fabricated.

In step 120 pixel array 16 is exposed to a scene of uniform radiance, and a plurality of frames are captured. Because column amplifiers in the sensor array for which the method was adapted were found to have a dominant additive term, but a relatively insignificant multiplicative term influencing fixed pattern noise, the setup routine provides for pixel array exposure to a single scene of known radiance. It will be recognized, however, that finding a column-specific multiplicative fixed pattern noise term would require exposure to a scene having a second known radiance, as described in the method discussed in connection with FIG. 5b. Referring again to the method described in connection with FIG. 6, it is seen that instead of storing into memory 34 each pixel value for each frame as in the case of a pixel-by-pixel noise compensation configuration method, a column white value for each column is determined at step 122 and stored after each frame is captured, thereby conserving memory space and calculation time relative to the time and memory space required for setting up an imaging system for compensating for pixel-by-pixel fixed pattern noise. The column white value associated with each column is preferably determined by finding the highest gray scale value present in a column, after a predetermined number (for example, the highest 6.25%) of the column's highest gray scale values are discarded. Alternatively, a column's column white value may be determined, for example, by finding an average gray scale value associated with all pixels of a column, or by finding an adjusted average white value of all pixels of a column, after selected high, low, or anomalous pixel values are discarded. After a column white value is determined for each column of each frame, the resulting set of column white values are averaged at step 124 to determine an average column white value for each column.

A correction value for each column is then determined by subtracting a reference value from each average column white value, in accordance with Eq. 2 wherein column reference value is substituted for $P_{REF}$. As in the case of a pixel-by-pixel compensation configuration method, the reference value may be a predetermined reference value or may be a value determined based on the value of some or all of the remaining column white values.

Figure 7:
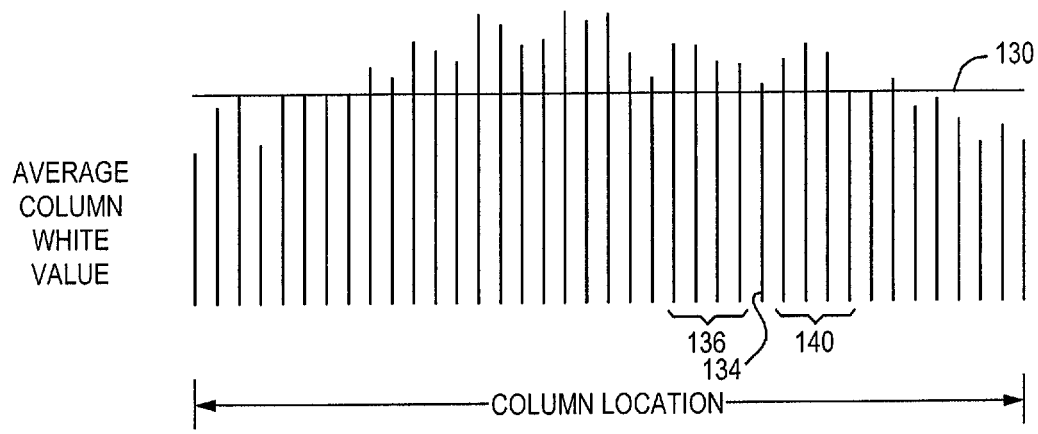
FIG. 7 is a table for use in describing a column dominant noise compensation configuration method which summarizes average column white values for a group of columns.

Step 126 for selecting or determining a reference value is explained in detail with reference to FIG. 7 showing a graph of average column white values, which is constructed by finding the column white value for each column of data in each frame captured, and then averaging the column white values. A reference value could be selected to be an arbitrary constant value in the range of average column white values. If a reference value is selected to be an arbitrary constant value, as represented by reference 130 in FIG. 7 then the same arbitrary constant value is subtracted from average column white value for each column for which a column correction value is determined.

For decoding applications, the inventors discovered that the quality of the decoding is improved if the column reference value in certain applications is selected to be other than a constant reference. In particular, the inventors discovered that the quality of decoding is improved if column reference values are selected to change in accordance with a certain pattern of light irradiance that is known to fall on a pixel array of conventional design.

According to the cosine effect described herein, the intensity of light rays striking a pixel array exposed to a uniform radiance scene tend to result in greater light irradiances at the location of center pixels than at the location of outer pixels.

Technically speaking, the cosine effect is a factor contributing to fixed pattern noise, and may be compensated for by selecting a column reference value of a constant value. In video record or display applications it may be desirable to compensate for the cosine effect for enhancement of the video image quality. However, the inventors found that for decoding applications, the quality of the decoding is enhanced if reference values are selected to correct for neighbor-to-neighbor pixel noise but are not selected to correct for sources resulting in gradual changes in pixel values such as the cosine effect. Gradual changes in pixel voltages do not seriously affect the quality of decoding operations. Decoding operations, however, are seriously affected if abrupt changes in pixel values are observed in neighboring pixels of an array exposed to a uniform radiance scene. The presence of abrupt changes in pixel values of neighboring pixels exposed to a uniform scene can result in a misplacement of edge positions or in an erroneous edge position detection.

To the end that reference values are selected to correct for neighbor-to-neighbor pixel noises but are not selected to correct for sources resulting in gradual changes in pixel values, a different reference value may be determined for every column correction value determined. In one embodiment of the invention, reference values for determining column correction values are determined by taking into account the average column white values associated with the column locations surrounding the column location for which a reference value is currently being calculated. With reference to FIG. 7 a reference value for determining a correction value for a given column is determined by averaging the column white value of the column of interest, e.g. 134, and the average column white values of a predetermined number of surrounding columns, e.g. columns 136 and columns 140. In one example of the invention, a reference value for determining each column's correction value is determined by averaging the average column white values, corresponding to the column of interest, 24 columns preceding the column of interest and 24 columns forward of the column of interest.

The method described herein of utilizing column white values associated with columns surrounding and possibly including the column of interest to determine a reference value for the column of interest is especially useful in developing a selection of column reference values that accurately reflect the impact of gradual changes on pixel values read from array. It will be recognized that the method can also be used to accurately select reference values so that the reference values accurately represent the impact on pixel radiance owing to other sources of fixed pattern noise. The concept of utilizing measured pixel value data in determining reference values can also be applied on a pixel specific basis. For example the white values of pixels surrounding and possibly including a pixel of interest can be used in determining a reference value for use in determining a correction value for a specific pixel in a setup routine for determining pixel.

Further aspects of the invention relate to methods and apparatuses for compensating values read from a pixel array, once additive term and/or multiplicative term correction values have been determined according to the equation $$P_{CORRECTED} = \frac{(P_M - A)}{M}$$

where $P_{CORRECTED}$ is the corrected pixel value as calculated utilizing correction terms A and M. As discussed in the background, prior art compensation schemes include hardware components which are selectively activated so that values read from a pixel array are automatically biased in accordance with previously determined correction terms.

In the correction method of the present invention, the time requirements for carrying out pixel value corrections is minimized by a scheme wherein correction values are retrieved from memory, normally ROM 32 and used to correct pixel values, only when stored pixel values are retrieved from RAM 34 during the execution of a decoding algorithm. This method greatly reduces the number of correction operations that have to be executed. In many decoding apparatuses such as the Welch Allyn IT4400 bar code reader, a region of interest is defined in a captured frame before decoding operations commence. Using the correction method of the present invention, the number of correction operations that have to be carried out is reduced, because such corrections need only be made for those pixel locations within the region of interest.

Another advantage of the correction method of the present invention allows for the selection of correction values between a large number of discrete values without requiring the providing of costly and space consuming physical elements as in the design known in the prior art. If the correction value is selected to be an 8 bit binary value then the correction value can be selected between 256 discrete values. To further the resolution achievable with the correction method of the invention, the number of bits characterizing the correction value may be increased or else the binary correction value may be used in combination with an analog hardware compensation scheme.

While the present invention has been explained with reference to a number of specific embodiments for the purpose of disclosing the best mode of making and carrying out the invention, it will be understood that the spirit and scope of the present invention should be determined with reference to the appended claims.

The invention claimed is:

1. A method for configuring an imaging system, comprising:
    exposing a two dimensional pixel array within the imaging system to a scene having a known radiance;
    capturing a predetermined number of image signal frames of the known radiance scene;
    discarding a predetermined number of pixel values in at least one column of the two dimensional pixel array when each frame is captured based on gray scale values of the pixel values;
    thereafter, finding a column white value for each column of the two dimensional pixel array when each frame is captured;
    averaging the column white values to determine an average column white value for each column of the two dimensional pixel array;
    comparing each average column white value to a predetermined reference value for each column, and therefrom determining a correction value for each column of the two dimensional pixel array; and
    storing each correction value in a storage location for retrieval by the imaging system.

2. The method of claim 1, wherein:
    the step of discarding a predetermined number of pixel values in at least one column of the two dimensional pixel array comprises discarding a predetermined number of highest gray scale valued pixel values in a column; and
    the step of finding a column white value for each column comprises identifying the highest gray scale value present out of the remaining pixel values of the column.

3. The method of claim 1, wherein:
    the step of discarding a predetermined number of pixel values in at least one column of the two dimensional pixel array comprises discarding a predetermined number of highest gray scale valued pixel values in a column; and
    the step of finding a column white value for each column comprises averaging the gray scale values of the remaining pixel values.

4. The method of claim 1, wherein the predetermined reference value of each column is a constant value in the range of column white values for the two dimensional pixel array.

5. The method of claim 1, comprising determining the predetermined reference value for a given column based on an average column white value associated with at least one column positionally related to the given column.

6. The method of claim 1, comprising determining the predetermined reference value for a given column based on an average column white value associated with the given column and an average column white value associated with at least one column positionally related to the given column.

7. A method for operating an imaging system, comprising:
exposing a two dimensional pixel array within the imaging system to a scene having a known radiance;
capturing a predetermined number of image signal frames of the known radiance scene;
discarding a predetermined number of pixel values in at least one column of the two dimensional pixel array when each frame is captured based on gray scale values of the pixel values;
thereafter, finding a column white value for each column of the two dimensional pixel array when each frame is captured;
averaging the column white values to determine an average column white value for each column of the two dimensional pixel array;
comparing each average column white value to a predetermined reference value for each column, and therefrom determining a correction value for each column of the two dimensional pixel array;
capturing a frame of image data;
correcting a plurality of pixel values in the captured frame of image data using the determined correction values to obtain a corrected frame of image data; and
attempting to decode indicia in the corrected frame of image data.

8. The method of claim 7, comprising storing a correction value for substantially all of the pixels in the two dimensional pixel array.

9. The method of claim 7, comprising storing a correction value for substantially all of the columns in the two dimensional pixel array.

10. The method of claim 7, comprising:
storing the captured frame of image data in a memory location; and
reading the captured frame of image data from the memory location while performing the step of correcting a plurality of pixel values in the captured frame of image data.

11. The method of claim 7, wherein the steps of capturing a frame of image data and correcting a plurality of pixel values in the captured frame of image data are performed substantially contemporaneously.

12. The method of claim 7, wherein the steps of capturing a frame of image data and correcting a plurality of pixel values in the captured frame of image data are performed substantially contemporaneously and the corrected frame of image data is stored in a memory location.

* * * * *